US012777244B2

(12) United States Patent
Oyama et al.

(10) Patent No.: US 12,777,244 B2
(45) Date of Patent: Oct. 27, 2026

(54) ELECTRONIC DEVICE, CONTROL METHOD OF ELECTRONIC DEVICE, AND NON-TRANSITORY COMPUTER READABLE MEDIUM

(71) Applicant: CANON KABUSHIKI KAISHA, Tokyo (JP)

(72) Inventors: Yasufumi Oyama, Kanagawa (JP); Hiroyuki Suzuki, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 38 days.

(21) Appl. No.: 18/983,719

(22) Filed: Dec. 17, 2024

(65) Prior Publication Data

US 2025/0211848 A1 Jun. 26, 2025

(30) Foreign Application Priority Data

Dec. 25, 2023 (JP) ................................ 2023-218081

(51) Int. Cl.
*H04N 23/63* (2023.01)
*H04N 23/68* (2023.01)
*H04N 23/695* (2023.01)

(52) U.S. Cl.
CPC ......... *H04N 23/635* (2023.01); *H04N 23/695* (2023.01)

(58) Field of Classification Search
CPC . H04N 23/632; H04N 23/6815; H04N 23/695
USPC ..................................................... 348/208.99
See application file for complete search history.

(56) References Cited

U.S. PATENT DOCUMENTS

2002/0180878 A1 12/2002 Iida et al.
2020/0284392 A1 9/2020 Su et al.
2021/0120176 A1* 4/2021 Wang .................. H04N 23/687
2021/0203839 A1* 7/2021 Ye .......................... H04N 23/64
2021/0263394 A1* 8/2021 Su ........................ F16M 11/128

FOREIGN PATENT DOCUMENTS

JP 2015180917 A 10/2015
JP 2017227516 A * 12/2017

OTHER PUBLICATIONS

The above patent documents were cited in a European Search Report issued on May 28, 2025, that issued in the corresponding European Patent Application No. 24222810.4.

* cited by examiner

*Primary Examiner* — Anthony J Daniels
(74) *Attorney, Agent, or Firm* — Cowan, Liebowitz & Latman, P.C.

(57) ABSTRACT

An electronic device acquires information regarding a difference between an orientation of a grip part gripped by a user and an orientation of imaging part disposed so as to be able to change the orientation with respect to the grip part, and performs control so as to display an image captured by the imaging part, wherein in a case where the orientation of the grip part changes, the orientation of the imaging part follows the orientation of the grip part more gently than the change in the orientation of the grip part, and control is performed on a basis of the information such that a range or a position predicted as an imaging range or a position of the imaging range at a time of completion of following by the imaging part is identifiable on the image.

17 Claims, 11 Drawing Sheets

ELECTRONIC DEVICE, CONTROL METHOD OF ELECTRONIC DEVICE, AND NON-TRANSITORY COMPUTER READABLE MEDIUM

BACKGROUND OF THE INVENTION

Field of the Invention

The present invention relates to an electronic device, a control method of the electronic device, and a non-transitory computer readable medium, and particularly relates to control to prevent shaking of a shot video during shooting.

Description of the Related Art

In recent years, Vlog shooting in which an individual records daily life in a movie for transmission on an SNS or the like has been widely performed. A person who performs shooting often performs Vlog shooting while holding an imaging apparatus with a hand and walking. For this reason, as Vlog shooting, shooting using an electric gimbal device that prevents shaking of a shot video is widely performed.

In shooting using an electric gimbal device, it may be desirable to suppress a movement (orientation change) of an imaging apparatus (imaging unit) due to camera shake and to moderate movement of the imaging apparatus intended by the person who performs shooting, such as panning or tilting. Japanese Patent Application Laid-Open No. 2015-180917 discloses a technique of separating a movement of an imaging apparatus into a movement of a low frequency component and a movement of a high frequency component, and canceling each of the movements in an appropriate form. In the technique disclosed in Japanese Patent Application Laid-Open No. 2015-180917, the movement of the low frequency component is gently suppressed when a non-panning state transitions to a panning state.

However, when the movement (orientation change) of the imaging apparatus (imaging unit) is made gentle, a timing at which the movement of the imaging apparatus settles is delayed with respect to a completion timing of an orientation change operation (an operation of changing an orientation of the imaging apparatus) by a person who performs shooting. Therefore, there is a possibility that a difference occurs between a direction intended by the person who performs shooting and a direction in which the imaging apparatus finally settles. In a case where the direction in which the imaging apparatus finally settles is different from the direction intended by the person who performs shooting, when the direction of the imaging apparatus is adjusted again, an unnatural shot video is obtained.

SUMMARY OF THE INVENTION

The present invention provides a technique for allowing a person who performs shooting to easily direct an imaging unit in a direction intended by the person who performs shooting in a case where an orientation change of the imaging unit is made gentle.

An electronic device according to the present invention including a processor, and a memory storing a program which, when executed by the processor, causes the electronic device to execute acquisition processing to acquire information regarding a difference between an orientation of a grip part gripped by a user and an orientation of imaging part disposed so as to be able to change the orientation with respect to the grip part, and execute display control processing to perform control so as to display an image captured by the imaging part, wherein in a case where the orientation of the grip part changes, the orientation of the imaging part follows the orientation of the grip part more gently than the change in the orientation of the grip part, and in the display control processing, control is performed on a basis of the information such that a range or a position predicted as an imaging range or a position of the imaging range at a time of completion of following by the imaging part is identifiable on the image.

Further features of the present invention will become apparent from the following description of exemplary embodiments with reference to the attached drawings.

DESCRIPTION OF THE EMBODIMENTS

Figure 1A:
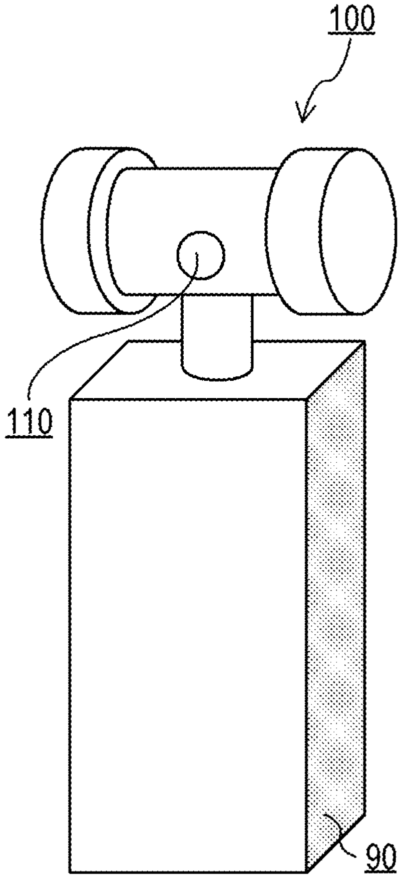
FIGS. 1A and 1B are external views of a digital camera.
Figure 1B:
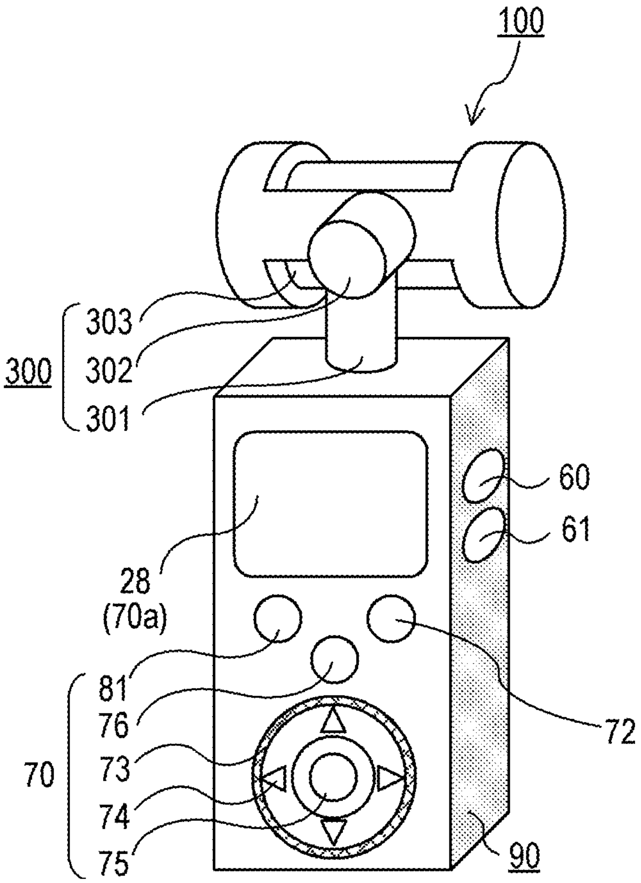

Hereinafter, an embodiment of the present invention will be described with reference to the drawings. FIGS. 1A and 1B are external views of a digital camera 100 (imaging apparatus) as an example of an apparatus (electronic device) to which the present invention can be applied. FIG. 1A is a front perspective view of the digital camera 100, and FIG. 1B is a rear perspective view of the digital camera 100.

The digital camera 100 includes a grip part 90, an imaging unit 110, and an orientation control unit 300. The imaging unit 110 (imaging part) is disposed so as to be able to change its orientation with respect to the grip part 90. The orientation control unit 300 includes a pan shaft drive unit 301, a roll shaft drive unit 302, and a tilt shaft drive unit 303. The pan shaft drive unit 301 is fixed to the grip part 90, and the tilt shaft drive unit 303 is fixed to the imaging unit 110. By driving (rotating) at least one of the pan shaft drive unit 301, the roll shaft drive unit 302, and the tilt shaft drive unit 303, an orientation of the imaging unit 110 with respect to the grip part 90 can be maintained or changed. The grip part 90 and the orientation control unit 300 may be separable, or the imaging unit 110 and the orientation control unit 300 may be separable. In a case where the imaging unit 110 and the orientation control unit 300 are separable, the imaging unit 110 may be a smartphone or the like. The orientation control unit 300 is a unit like an electric gimbal device, but a non-electric gimbal device may be used instead of the orientation control unit 300.

A display unit 28 displays images and various types of information. A touch panel 70*a* can detect a touch operation on a display surface (touch operation surface) of the display unit 28. A shutter button 61 is an operation member for giving a shooting instruction. A mode selector switch 60 is an operation member for switching among various modes. A power switch 72 is an operation member for switching between ON and OFF of power supply of the digital camera 100.

A controller wheel 73 is a rotatable operation member, and is used, for example, to instruct a selection item. When a rotation operation of the controller wheel 73 is performed, an electrical pulse signal is generated according to an operation amount (rotation amount), and each unit of the digital camera 100 is controlled on the basis of the pulse signal. An angle and a rotation speed of the rotation operation for the controller wheel 73 can be determined by the pulse signal. The controller wheel 73 only needs to be an operation member capable of detecting a rotation operation, and may be, for example, a dial operation member in which the controller wheel 73 itself rotates according to the rotation operation to generate a pulse signal. The controller wheel 73 may be an operation member (so-called touch wheel) including a touch sensor, or may be an operation member that detects a rotational motion of a user's finger on the controller wheel 73 without rotation of the controller wheel 73 itself.

A four-direction key 74 is configured to be able to press each of an upper portion, a lower portion, a left portion, and a right portion, and can perform processing corresponding to a pressed portion of the four-direction key 74. A SET button 75 is a push button, and is mainly used to determine a selection item. A movie button 76 is a push button, and is used for an instruction to start or stop movie shooting (recording). A menu button 81 is a push button used to perform an instruction operation for displaying a menu screen, and when the menu button 81 is pressed, a menu screen on which various settings can be made is displayed on the display unit 28. A user can perform various settings instinctively by using the menu screen displayed on the display unit 28, the four-direction key 74, and the SET button 75.

Figure 2:
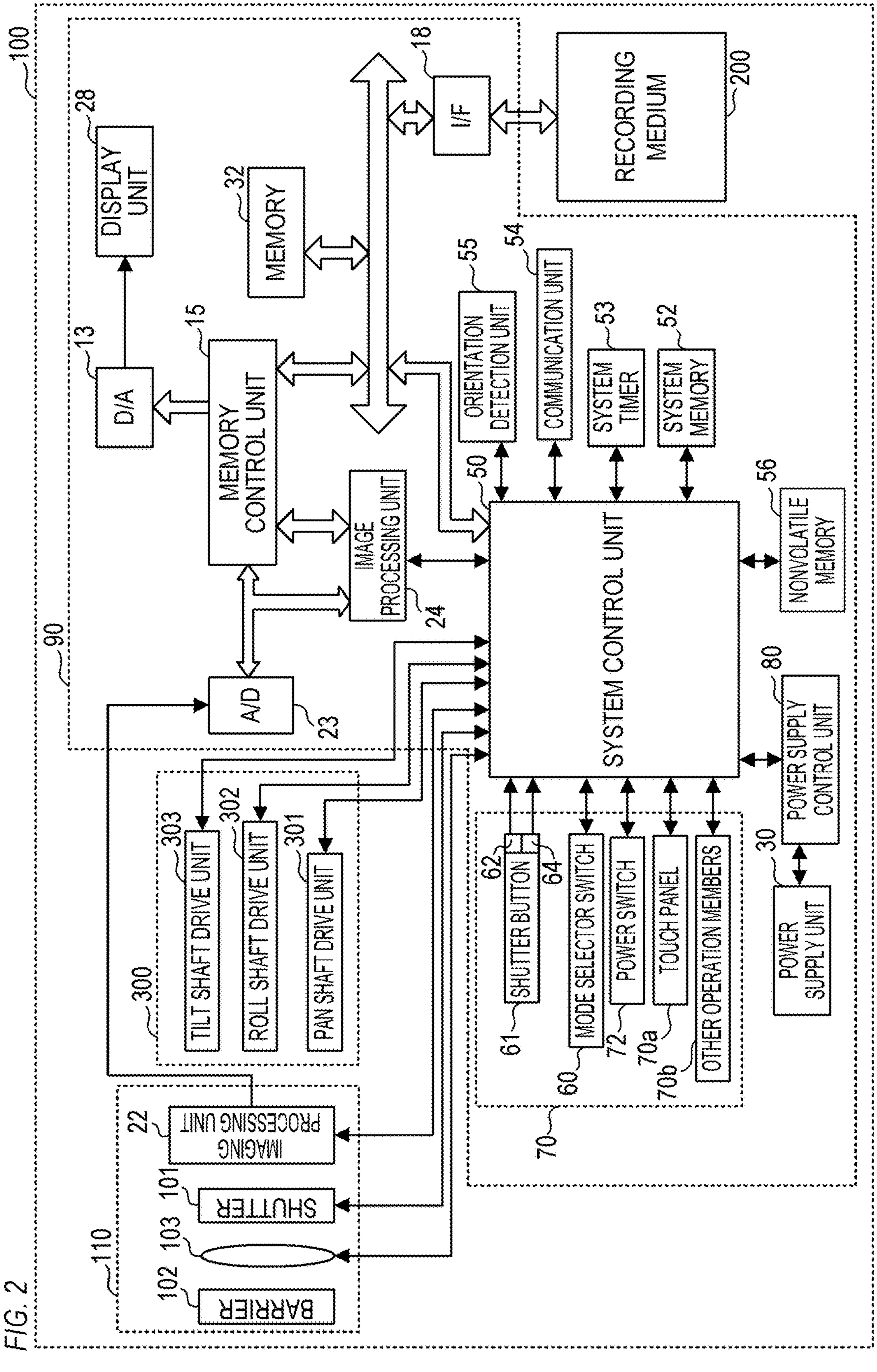
FIG. 2 is a block diagram illustrating a configuration of the digital camera.

FIG. 2 is a block diagram illustrating a configuration of the digital camera 100.

An imaging lens 103 is a lens group including a zoom lens and a focus lens. A shutter 101 is a shutter having an aperture function. An imaging processing unit 22 is an imaging element (image sensor) constituted by a CCD, a CMOS element, or the like that converts an optical image into an electrical signal. An A/D converter 23 converts an analog signal output from the imaging processing unit 22 into a digital signal. A barrier 102 covers an imaging system including the imaging lens 103, the shutter 101, and the imaging processing unit 22 of the digital camera 100, thereby preventing contamination or damage of the imaging system.

An image processing unit 24 performs predetermined processing (such as pixel interpolation, resizing processing such as shrinking, and color conversion processing) on data from the A/D converter 23 or data from a memory control unit 15. In addition, the image processing unit 24 performs predetermined arithmetic processing by using captured image data, and a system control unit 50 performs exposure control and distance measurement control on the basis of a result of the calculation obtained by the image processing unit 24. As a result, through-the-lens (TTL)-type autofocus (AF) processing, auto exposure (AE) processing, and flash pre-flash (EF) processing are performed. Furthermore, the image processing unit 24 performs predetermined arithmetic processing by using the captured image data, and performs TTL-type auto white balance (AWB) processing on the basis of an obtained result of the calculation.

The memory control unit 15 controls transmission and reception of data among the A/D converter 23, the image processing unit 24, and the memory 32. Output data from the A/D converter 23 is written into a memory 32 via the image processing unit 24 and the memory control unit 15. Alternatively, the output data from the A/D converter 23 is written into the memory 32 via the memory control unit 15 without intervention of the image processing unit 24. The memory 32 stores image data that is obtained by the imaging processing unit 22 and is converted into digital data by the A/D converter 23 and image data to be displayed on the display unit 28. The memory 32 has a storage capacity that is large enough to store a predetermined number of still images and movie images and voice in a predetermined time. In addition, the memory 32 also serves as a memory (video memory) for image display. The D/A converter 13 converts image data that is to be displayed and is stored in the memory 32 into an analog signal and supplies the analog signal to the display unit 28. Thus, the image data that is to be displayed and is written into the memory 32 is displayed by the display unit 28 via the D/A converter 13.

The display unit 28 is a display such as an LCD or an organic EL, and performs display corresponding to an analog signal from the D/A converter 13. A digital signal that is A/D converted by the A/D converter 23 and is accumulated in the memory 32 is converted into an analog signal in the D/A converter 13, and the analog signal is sequentially transferred to and displayed on the display unit 28, whereby live view display (LV display) can be performed. Hereinafter, an image displayed in live view display is referred to as a live view image (LV image).

A nonvolatile memory 56 is a memory as an electrically erasable and recordable recording medium, and is, for example, an EEPROM. In the nonvolatile memory 56, constants, programs, and the like for an operation of the system control unit 50 are stored. The program as used herein is a computer program for executing various flowcharts described later. The system control unit 50 is a control unit including at least one processor and/or at least one circuit, and controls the entire digital camera 100. The system control unit 50 implements processing described later by executing a program stored in the nonvolatile memory 56. A system memory 52 is, for example, a RAM, and the system control unit 50 loads constants, variables, and programs read from the nonvolatile memory 56 for an operation of the system control unit 50 into the system memory 52. In addition, the system control unit 50 also performs display control by controlling the memory 32, the D/A converter 13, the display unit 28, and the like.

A system timer 53 is a timer unit that counts time used for various controls and time of a built-in clock.

A communication unit 54 transmits and receives a video signal and a voice signal to and from an external device connected thereto wirelessly or via a wired cable. The communication unit 54 is also connectable to a wireless local area network (LAN) and the Internet. In addition, the communication unit 54 can communicate with an external device also via Bluetooth (registered trade mark) or Bluetooth Low Energy. The communication unit 54 can transmit an image captured by the imaging processing unit 22 (including an LV image) and an image recorded in the recording medium 200, and can receive image data and other various types of information from an external device.

An orientation detection unit 55 detects an orientation of the grip part 90 with respect to the direction of gravity. On the basis of the orientation detected by the orientation detection unit 55, it can be determined whether an image shot by the imaging processing unit 22 is an image shot with the grip part 90 held horizontally or vertically. The system control unit 50 can add direction information corresponding to the orientation detected by the orientation detection unit 55 to an image file of the image captured by the imaging processing unit 22, or rotate and record the image. In addition, the system control unit 50 can maintain an orientation of the imaging unit 110 with respect to the direction of gravity by operating the orientation control unit 300 on the basis of the information of the orientation change detected by the orientation detection unit 55. The system control unit 50 can also change the orientation of the imaging unit 110 while suppressing a sudden orientation change of the imaging unit 110. For example, an acceleration sensor, a gyro sensor, or the like can be used for the orientation detection unit 55. It is also possible to detect a movement of the grip part 90 (whether or not the grip part 90 is panning, tilting, rolling, lifting, stationary, or the like) by using an acceleration sensor or a gyro sensor which is the orientation detection unit 55.

A power supply control unit 80 includes a battery detection circuit, a DC-DC converter, a switch circuit that switches a block to be energized, and the like, and detects whether or not a battery is mounted, the type of battery, a remaining battery level, and the like. In addition, the power supply control unit 80 controls the DC-DC converter on the basis of a result of the detection and an instruction from the system control unit 50, and supplies a required voltage to portions including the recording medium 200 for a necessary period of time. A power supply unit 30 is a primary battery such as an alkaline battery or a lithium battery, a secondary battery such as a NiCd battery, a NiMH battery, or a Li battery, or an AC adapter.

A recording medium I/F 18 is an interface to the recording medium 200 such as a memory card or a hard disk. The recording medium 200 is a recording medium such as a memory card for recording shot images, and is constituted by a semiconductor memory, an optical disk, a magnetic disk, or the like.

An operation unit 70 is an input unit that receives an operation from a user (user operation), and is used for inputting various operation instructions to the system control unit 50. Functions are appropriately assigned to operation members of the operation unit 70 for each scene by, for example, selecting and operating various function icons displayed on the display unit 28, and the operation members of the operation unit 70 act as various function buttons. Examples of the function buttons include an end button, a return button, an image feed button, a jump button, a narrowing button, and an attribute change button.

As illustrated in FIG. 2, the operation unit 70 includes the mode selector switch 60, the shutter button 61, the power switch 72, the touch panel 70*a*, other operation members 70*b*, and the like. The other operation members 70*b* include the controller wheel 73, the four-direction key 74, the SET button 75, the movie button 76, the menu button 81, and the like.

The mode selector switch 60 switches an operation mode of the system control unit 50 to any one of a still image recording mode, a movie shooting mode, a playback mode, and the like. The still image recording mode includes modes such as an auto shooting mode, an auto scene determination mode, a manual mode, an aperture-priority mode (Av mode), a shutter-speed priority mode (Tv mode), and a program AE mode (P mode). In addition, the still image recording mode also includes various scene modes that are shooting settings for different shooting scenes, a custom mode, and the like. A user can directly switch an operation mode to any one of these modes with the mode selector switch 60. Alternatively, the user may temporarily switch a screen to a list screen of a shooting mode with the mode selector switch 60 and then selectively switch the mode to any one of the plurality of displayed modes with another operation member. Similarly, the movie shooting mode may include a plurality of modes.

The shutter button 61 includes a first shutter switch 62 and a second shutter switch 64. The first shutter switch 62 is turned on in the middle of an operation of the shutter button 61 in response to so-called half-press (shooting preparation instruction) and generates a first shutter switch signal SW1. The system control unit 50 starts a shooting preparation operation such as autofocus (AF) processing, automatic exposure (AE) processing, automatic white balance (AWB) processing, or flash pre-flash (EF) processing with the first shutter switch signal SW1. The second shutter switch 64 is turned on at completion of the operation of the shutter button 61 in response to so-called full-press (shooting instruction) and generates a second shutter switch signal SW2. The system control unit 50 starts a series of shooting processing operations from reading a signal from the imaging processing unit 22 to writing a captured image as an image file into the recording medium 200 with the second shutter switch signal SW2.

The touch panel 70*a* is a touch sensor that detects various touch operations on a display surface of the display unit 28 (an operation surface of the touch panel 70*a*). The touch panel 70*a* and the display unit 28 can be integrally configured. For example, the touch panel 70*a* is configured such that a transmittance of light does not hinder display on the display unit 28, and is attached to an upper layer of the display surface of the display unit 28. Then, input coordinates on the touch panel 70*a* are associated with display coordinates on the display surface of the display unit 28. As a result, it is possible to provide a graphical user interface (GUI) configured as if the user can directly operate a screen displayed on the display unit 28.

For the touch panel 70*a*, the system control unit 50 can detect the following operations or states:

- an operation in which a finger or a pen that has not touched the touch panel 70*a* newly touches the touch panel 70*a*, that is, a start of a touch (hereinafter, referred to as touch-down);
- a state where a finger or a pen is touching the touch panel 70*a* (hereinafter, referred to as touch-on);
- an operation in which a finger or a pen is moving while touching the touch panel 70*a* (hereinafter, referred to as touch-move);
- an operation in which a finger or a pen that has touched the touch panel 70*a* is released from the touch panel 70*a*, that is, an end of the touch (hereinafter, referred to as touch-up); and
- a state where nothing touches the touch panel 70*a* (hereinafter, referred to as touch-off).

When the touch-down is detected, the touch-on is detected at the same time. After the touch-down, the touch-on is continuously detected normally unless the touch-up is detected. Even when the touch-move is detected, the touch-on is continuously detected. Even when the touch-on is detected, the touch-move is not detected as long as the touch position is not moved. After the touch-up of all the fingers and the pens that have touched the touch panel 70*a* is detected, the touch-off is detected.

The system control unit 50 is notified of these operations and states and position coordinates touched by a finger or a pen on the touch panel 70*a* via an internal bus. Then, the system control unit 50 determines what kind of operation (touch operation) has been performed on the touch panel 70*a* on the basis of the information of which the system control unit 50 is notified. With regard to the touch-move, a movement direction of a finger or a pen moving on the touch panel 70*a* can be determined for each vertical component and for each horizontal component on the touch panel 70*a* on the basis of a change of the position coordinates. When the touch-move for a predetermined distance or more is detected, it is determined that a sliding operation has been performed. An operation of quickly moving a finger by a certain distance while touching the touch panel 70*a* and releasing the finger is called a flick. In other words, the flick is an operation of quickly tracing the touch panel 70*a* so as to flick the touch panel 70*a* with a finger. When the touch-move at a predetermined speed or higher for a predetermined distance or more is detected and then the touch-up is detected, it can be determined that a flick has been performed (it can be determined that a flick has been performed following the sliding operation). Furthermore, a touch operation in which a plurality of places (for example, two points) are both touched (multi-touched) and the touch positions are brought close to each other is referred to as pinch-in, and a touch operation in which the touch positions are moved away from each other is referred to as pinch-out. The pinch-out and the pinch-in are collectively referred to as a pinch operation (or simply referred to as pinch). The touch panel 70*a* may be any type of touch panel among various types such as a resistive film type, a capacitance type, a surface acoustic wave type, an infrared light type, an electromagnetic induction type, an image recognition type, and an optical sensor type. There are a type in which a touch is detected due to contact with the touch panel and a type in which a touch is detected due to approach of a finger or a pen to the touch panel, but either of these types may be used.

In the present embodiment, in a case where the orientation of the grip part 90 changes, the system control unit 50 controls the orientation of the imaging unit 110 such that the orientation of the imaging unit 110 follows the orientation of the grip part 90 more gently than the change in the orientation of the grip part 90. The orientation of the imaging unit 110 is controlled via the orientation control unit 300. However, when such control is performed, a user (person who performs shooting) cannot grasp a direction in which the imaging unit 110 finally settles, and there is a possibility that a difference occurs between a direction intended by the user and the direction in which the imaging unit 110 finally settles. In a case where the direction in which the imaging unit 110 finally settles is different from the direction intended by the user, when the direction of the imaging unit 110 is adjusted again, an unnatural shot video is obtained.

Therefore, in the present embodiment, the system control unit 50 predicts an imaging range or a position of the imaging range at the time of completion of following by the imaging unit 110, and makes the imaging range or the position of the imaging range identifiable on the LV image. As a result, the user can easily grasp the direction in which the imaging unit 110 finally settles from the prediction range or the prediction position, and can adjust the direction of the grip part 90 before the imaging unit 110 settles. As a result, the user can easily direct the imaging unit 110 to his/her intended direction. The prediction range is a range predicted as an imaging range at the time of completion of following by the imaging unit 110, and the prediction position is a position predicted as a position of the imaging range at the time of completion of following by the imaging unit 110.

Figure 3A:
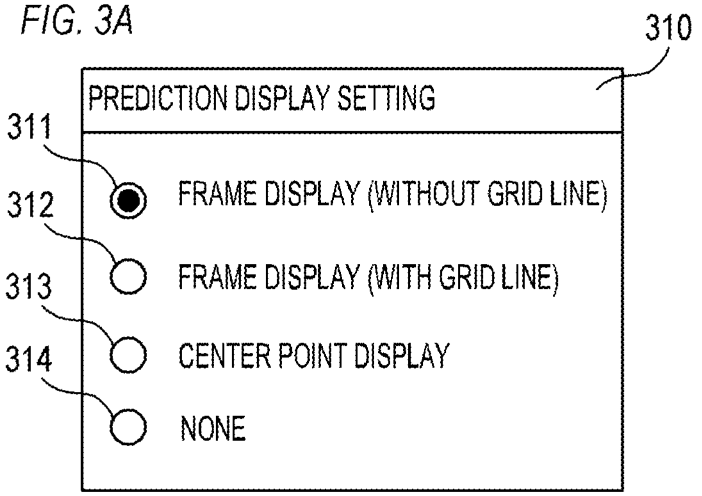
FIGS. 3A and 3B are schematic diagrams of a setting screen related to prediction display.

FIG. 3A is a schematic diagram illustrating a setting screen 310 related to prediction display (display in which a prediction range or a prediction position is identifiable). The setting screen 310 includes selection items 311 to 314. When the selection item 311 is selected, the system control unit 50 sets (enables) a mode for displaying a frame indicating a prediction range, and when the selection item 312 is selected, the system control unit 50 sets a mode for displaying the frame indicating the prediction range and a grid line of the frame. When the selection item 313 is selected, the system control unit 50 sets a mode for displaying a point indicating a prediction position, and when the selection item 314 is selected, the system control unit 50 sets a mode for not performing prediction display. In this manner, the system control unit 50 changes a display form of prediction display or switches whether or not to perform the prediction display according to an instruction from a user. Note that the prediction display mode is not limited thereto, and a mode for masking a region outside a prediction range in an LV image may be settable. The mask is, for example, a translucent and gray mask. Two or more of a point, a frame, a grid line, and a mask can be appropriately combined and displayed. For example, various modes such as a mode for displaying all of a point, a frame, a grid line, and a mask, a mode for displaying a point, a frame, and a mask, a mode for displaying a point and a frame, a mode for displaying a point and a mask, and a mode for displaying a frame and a mask may be settable.

In the present embodiment, the system control unit 50 performs control so as not to perform prediction display in a case where a difference between the orientation of the imaging unit 110 and the orientation of the grip part 90 is smaller than a threshold, and performs control so as to perform prediction display in a case where the difference is equal to or more than the threshold. Note that the system control unit 50 may perform control so as to perform prediction display regardless of whether or not the difference between the orientation of the imaging unit 110 and the orientation of the grip part 90 is smaller than the threshold. The system control unit 50 may perform control so as not to perform prediction display in a case where the difference between the orientation of the imaging unit 110 and the orientation of the grip part 90 is equal to or less than the threshold, and may perform control so as to perform prediction display in a case where the difference is larger than the threshold.

Figure 3B:
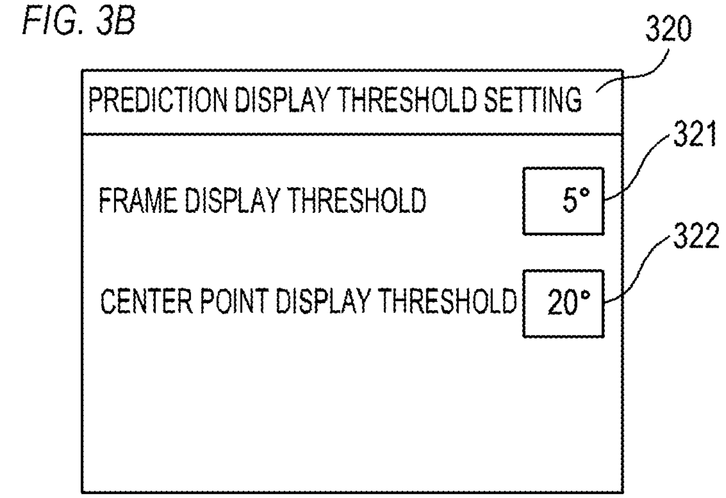

FIG. 3B is a schematic diagram illustrating a setting screen 320 related to the threshold described above. The setting screen 320 includes text boxes 321 and 322. In a case where the selection item 311 or the selection item 312 in FIG. 3A is selected, the system control unit 50 uses a numerical value input in the text box 321 as the threshold. In a case where the selection item 313 in FIG. 3A is selected, the system control unit 50 uses a numerical value input in the text box 322 as the threshold. In this manner, the system control unit 50 changes the threshold according to an instruction from a user.

Figure 4:
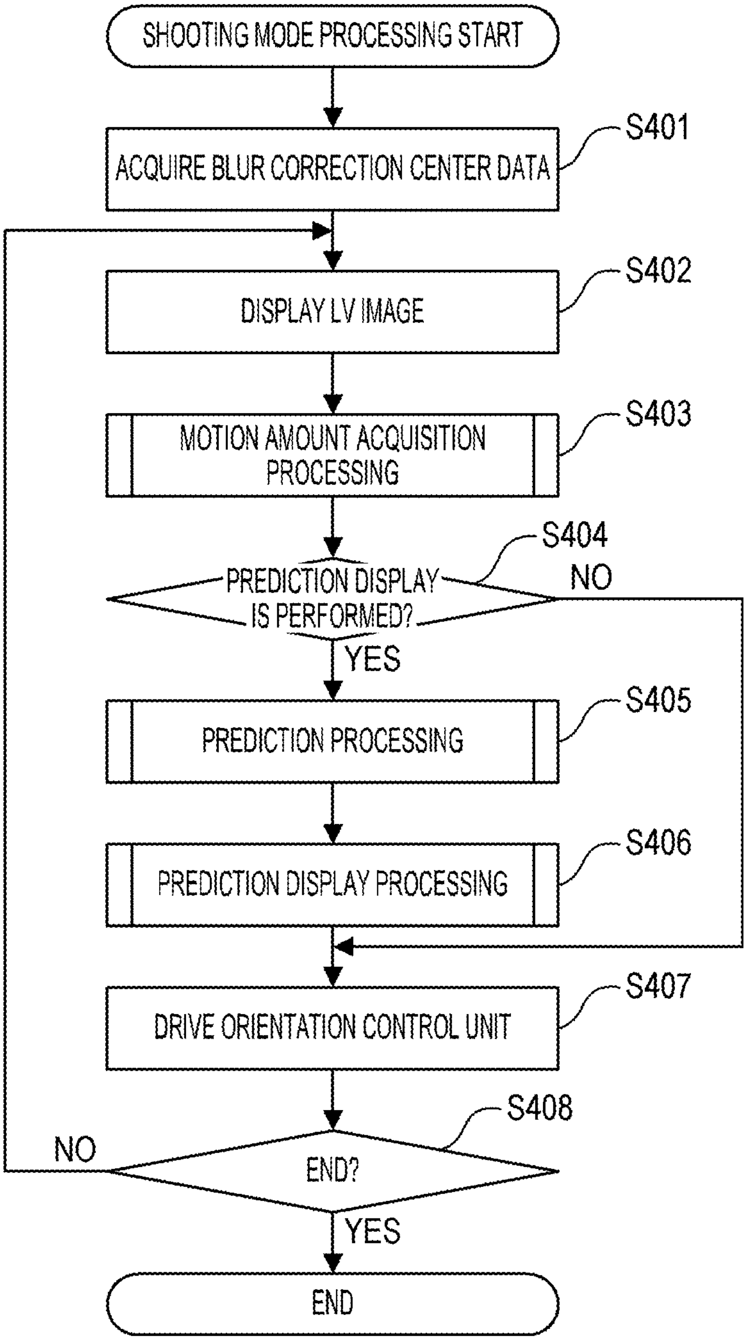
FIG. 4 is a flowchart of shooting mode processing.

FIG. 4 is a flowchart of shooting mode processing performed by the digital camera 100. The shooting mode processing in FIG. 4 is implemented by the system control unit 50 loading a program stored in the nonvolatile memory 56 into the system memory 52 and executing the program.

For example, when a shooting mode is set, the system control unit 50 starts the shooting mode processing of FIG. 4.

In S401, the system control unit 50 acquires orientation information indicating the orientation of the grip part 90 from the orientation detection unit 55, and stores the orientation information in the memory 32 via the memory control unit 15 as blur correction center data.

In S402, the system control unit 50 displays an LV image on the display unit 28.

In S403, the system control unit 50 performs motion amount acquisition processing of acquiring a motion amount (change amount of the orientation of the imaging unit 110) to be instructed to the orientation control unit 300. The system control unit 50 stores information of the acquired motion amount in the memory 32 via the memory control unit 15. Details of the motion amount acquisition processing will be described later with reference to FIG. 5.

In S404, the system control unit 50 determines whether or not to perform prediction display. If the system control unit 50 determines to perform the prediction display, the process proceeds to S405, and otherwise, the process proceeds to S407.

The system control unit 50 acquires a prediction display mode and threshold setting information from the nonvolatile memory 56, and acquires the information of the motion amount of the orientation control unit 300 (information stored in the memory 32 in S403) from the memory 32 via the memory control unit 15. In a case where a mode of not performing the prediction display is set, the system control unit 50 determines not to perform the prediction display. In a case where a mode for displaying a frame indicating a prediction range, a mode for displaying a frame indicating the prediction range and a grid line of the frame, or a mode for displaying a point indicating a prediction position is set, the system control unit 50 determines whether or not the motion amount of the orientation control unit 300 is equal to or more than a threshold. In a case where a difference between the orientation of the imaging unit 110 and the orientation of the grip part 90 is less than the threshold, the motion amount of the orientation control unit 300 is also less than the threshold. Then, in a case where the difference between the orientation of the imaging unit 110 and the orientation of the grip part 90 is equal to or more than the threshold, the motion amount of the orientation control unit 300 is also equal to or more than the threshold. Therefore, the system control unit 50 determines to perform the prediction display in a case where the motion amount is equal to or more than the threshold, and determines not to perform the prediction display in a case where the motion amount is less than the threshold.

In S405, the system control unit 50 performs prediction processing of predicting an imaging range or a position of the imaging range at the time of completion of following by the imaging unit 110. Details of the prediction processing will be described later with reference to FIG. 6.

In S406, the system control unit 50 performs prediction display processing of displaying a prediction range or a prediction position in an identifiable manner. Details of the prediction display processing will be described later with reference to FIG. 7.

In S407, the system control unit 50 acquires the information of the motion amount of the orientation control unit 300 (information stored in the memory 32 in S403) from the memory 32 via the memory control unit 15, and instructs the orientation control unit 300 on the motion amount. The orientation control unit 300 operates with the instructed motion amount. As a result, the orientation of the imaging unit 110 is changed by a change amount corresponding to the motion amount of the orientation control unit 300.

In S408, the system control unit 50 determines whether or not an end of the shooting mode processing has been instructed. If the system control unit 50 determines that the end of the shooting mode processing has been instructed, the shooting mode processing is ended, and otherwise, the process proceeds to S402. For example, in a case where the mode selector switch 60 has been operated, that is, in a case where switching to another operation mode has been instructed, the system control unit 50 determines that the end of the shooting mode processing has been instructed. In addition, in a case where the power switch 72 has been operated, that is, in a case where power-off of the digital camera 100 has been instructed, the system control unit 50 determines that the end of the shooting mode processing has been instructed.

Figure 5:
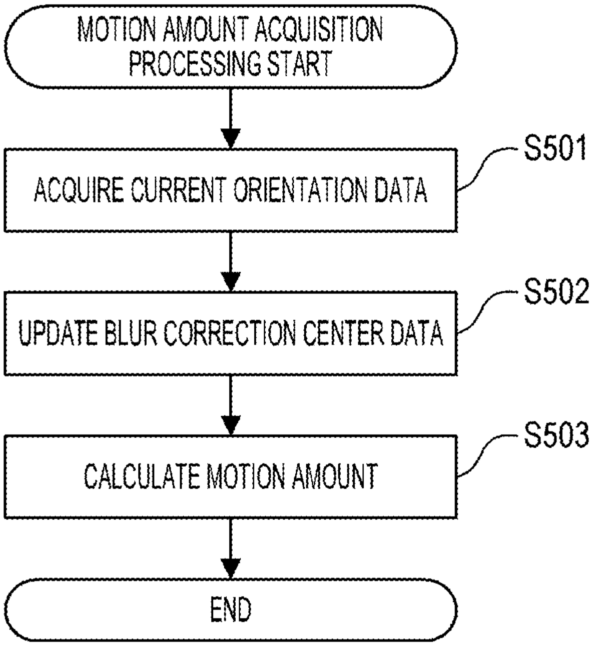
FIG. 5 is a flowchart of motion amount acquisition processing.

FIG. 5 is a flowchart of the motion amount acquisition processing performed in S403 of FIG. 4.

In S501, the system control unit 50 acquires orientation information indicating the orientation of the grip part 90 from the orientation detection unit 55, and stores the orientation information in the memory 32 via the memory control unit 15 as current orientation data.

In S502, the system control unit 50 acquires the blur correction center data and the current orientation data from the memory 32 via the memory control unit 15. Then, the system control unit 50 stores data indicating an orientation in which an orientation (target orientation) indicated by the blur correction center data is brought close to an orientation (current orientation) indicated by the current orientation data in the memory 32 via the memory control unit 15 as new blur correction center data. In a case where a difference between the target orientation and the current orientation is equal to or more than a predetermined amount, the system control unit 50 generates data indicating an orientation in which the target orientation is brought close to the current orientation by a predetermined amount as new blur correction center data. In a case where the difference between the target orientation and the current orientation is equal to or less than the predetermined amount, the system control unit 50 generates the same data as the current orientation data as new blur correction center data. By bringing the blur correction center data close to the current orientation data in this manner, it is possible to cause the orientation of the imaging unit 110 to follow the orientation of the grip part 90. The orientation of the imaging unit 110 follows the orientation of the grip part 90 more gently (at a slower speed as the predetermined amount is smaller) as the predetermined amount (change amount of the target orientation) is smaller.

In S503, the system control unit 50 acquires the blur correction center data from the memory 32 via the memory control unit 15. Then, the system control unit 50 calculates a motion amount of the orientation control unit 300 such that the orientation of the imaging unit 110 is maintained at an orientation of the blur correction center data, and stores information of the calculated motion amount in the memory 32 via the memory control unit 15.

Figure 6:
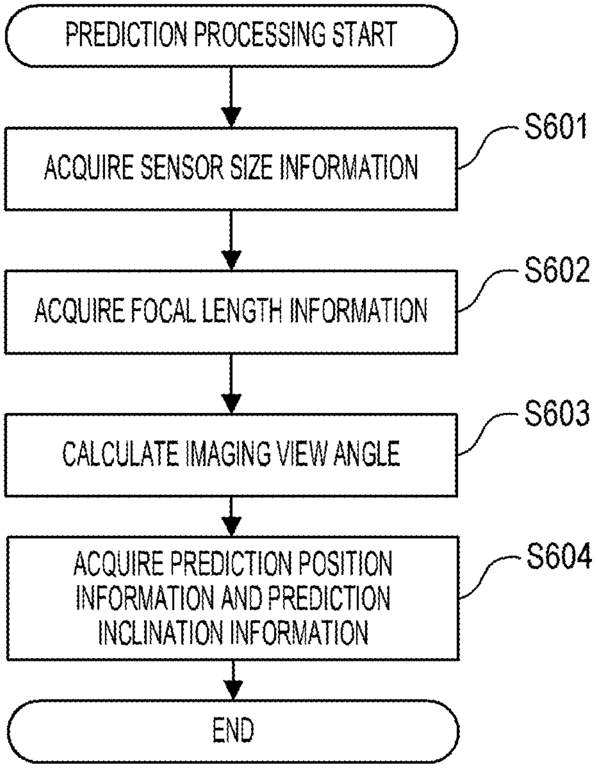
FIG. 6 is a flowchart of prediction processing.

FIG. 6 is a flowchart of prediction processing performed in S405 of FIG. 4

In S601, the system control unit 50 acquires image sensor size information of the imaging processing unit 22 from the nonvolatile memory 56, and stores the image sensor size information in the memory 32 via the memory control unit 15 as sensor size information.

In S602, the system control unit 50 acquires lens focal length information of the imaging lens 103 from the imaging lens 103, and stores the lens focal length information in the memory 32 via the memory control unit 15 as focal length information.

In S603, the system control unit 50 acquires the sensor size information and the focal length information from the memory 32 via the memory control unit 15. Then, the system control unit 50 calculates an imaging view angle of the imaging unit 110 from the acquired information, and stores information (imaging view angle information) of the calculated imaging view angle in the memory 32 via the memory control unit 15. For example, an imaging view angle θ [deg] in the horizontal direction can be calculated from a sensor size x [mm] in the horizontal direction and a focal length f [mm] by using the following formula 1. Then, the imaging view angle in the vertical direction can be calculated by using a sensor size in the vertical direction instead of the sensor size in the horizontal direction.

[Math. 1]

$$\theta = 2 \times \arctan\frac{x}{2 \times f} \quad \text{(Formula 1)}$$

In S604, the system control unit 50 acquires the current orientation data, the blur correction center data, and the imaging view angle information from the memory 32 via the memory control unit 15. Then, the system control unit 50 calculates a difference between the current orientation data and the blur correction center data as the difference (orientation difference) between the orientation of the grip part 90 and the orientation of the imaging unit 110. Then, the system control unit 50 calculates an imaging range at the time of completion of following by the imaging unit 110 from the orientation difference and the imaging view angle. For example, the system control unit 50 calculates a position and an inclination of the imaging range at the time of completion of following by the imaging unit 110. In a case where the imaging view angle is 46 degrees and there is an orientation difference of 23 degrees, an end of the LV image is a center of the imaging range at the time of completion of following. The system control unit 50 stores information of the calculated position in the memory 32 via the memory control unit 15 as prediction position information, and stores information of the calculated inclination in the memory 32 via the memory control unit 15 as prediction inclination information.

Figure 7:
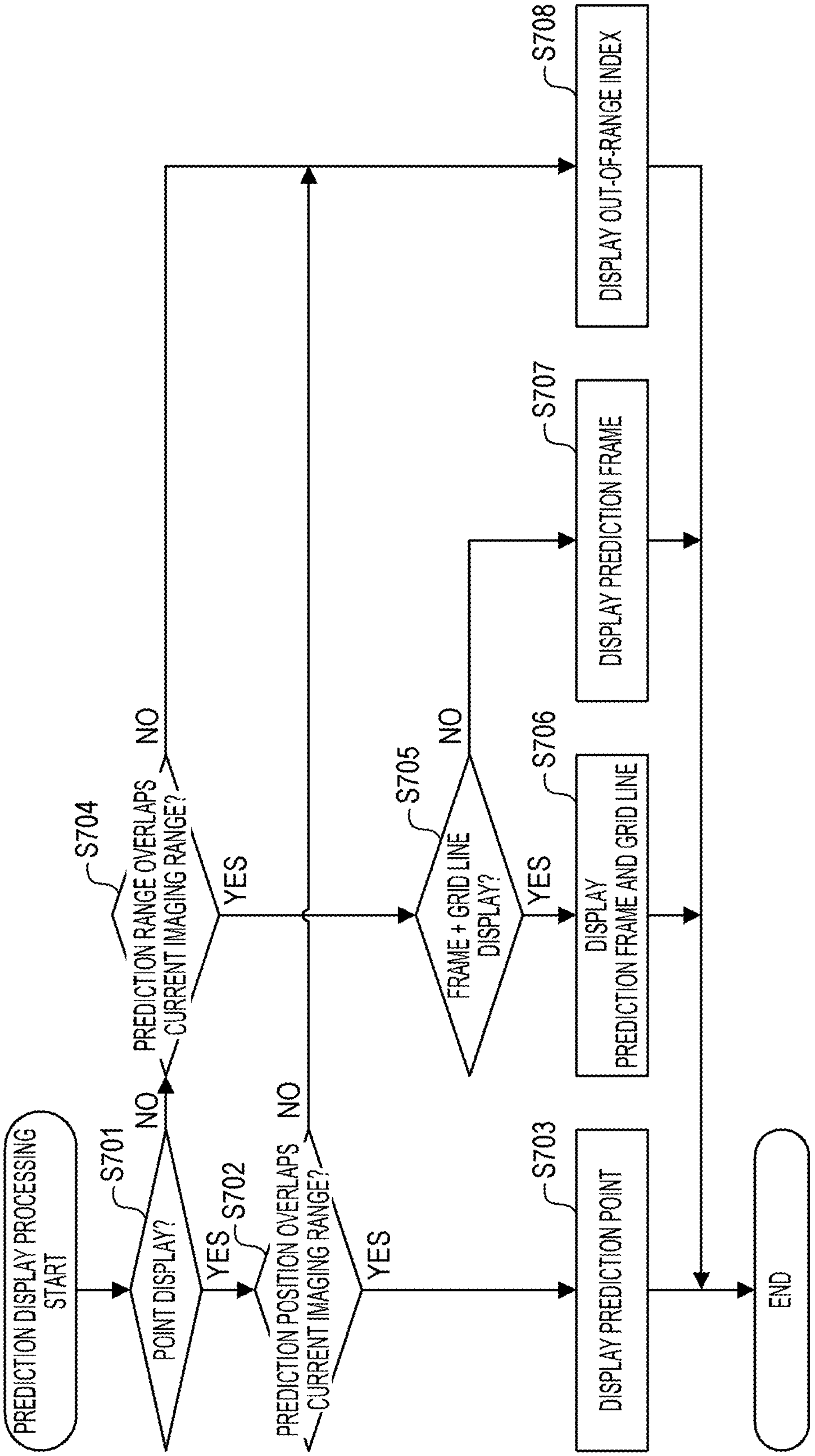
FIG. 7 is a flowchart of prediction display processing.

FIG. 7 is a flowchart of prediction display processing performed in S406 of FIG. 4.

In S701, the system control unit 50 acquires setting information of a prediction display mode from the nonvolatile memory 56, and determines whether or not a mode (point display mode) for displaying a point indicating a prediction position is set. If the system control unit 50 determines that the point display mode is set, the process proceeds to S702, and otherwise, the process proceeds to S704.

In S702, the system control unit 50 acquires the prediction position information from the memory 32 via the memory control unit 15, and determines whether or not the prediction position overlaps a current imaging range (whether or not the prediction position is within the current imaging range). If the system control unit 50 determines that the prediction position overlaps the current imaging range, the process proceeds to S703, and otherwise, the process proceeds to S708.

Figure 8:
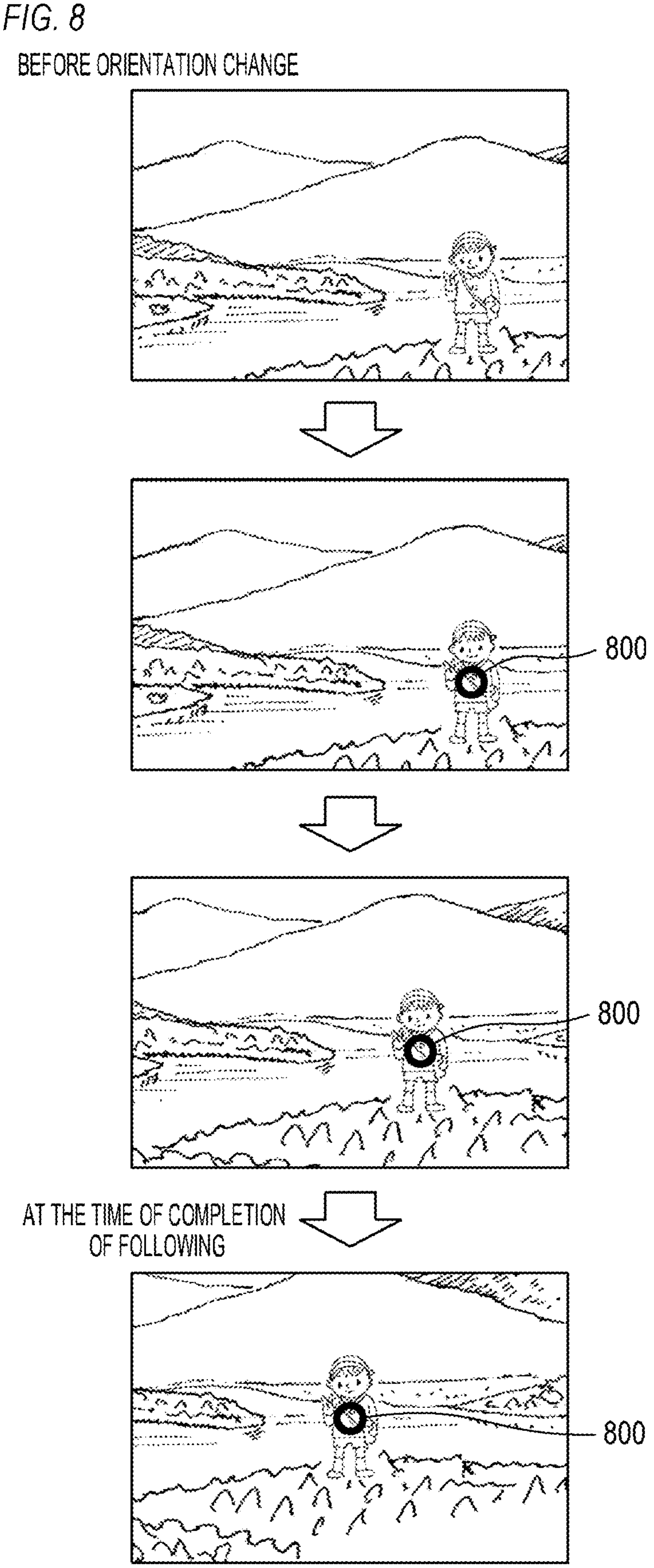
FIG. 8 is a schematic diagram illustrating transition of a display video in a point display mode.

In S703, the system control unit 50 displays a point (prediction point) indicating the prediction position on the display unit 28. FIG. 8 is a schematic diagram illustrating transition of a display video in a point display mode. FIG. 8 illustrates transition of a display video when a user turns the grip part 90 to a lower right. Before the user changes the orientation of the grip part 90, the prediction point is not displayed, and only the LV image is displayed. When the user changes the orientation of the grip part 90, a prediction point 800 is displayed. The prediction point 800 indicates a center position of an imaging range at the time of completion of following by the imaging unit 110. Therefore, the prediction point 800 gradually approaches a center of the LV image. Note that the prediction position is not limited to the center position of the imaging range at the time of completion of following by the imaging unit 110, and may be, for example, an upper left corner of the imaging range at the time of completion of following by the imaging unit 110.

In S704, the system control unit 50 acquires the prediction position information and the prediction inclination information from the memory 32 via the memory control unit 15, and determines a prediction range from these pieces of information. Then, the system control unit 50 determines whether or not the prediction range overlaps the current imaging range (whether or not at least a part of the prediction range is within the current imaging range). If the system control unit 50 determines that the prediction range overlaps the current imaging range, the process proceeds to S705, and otherwise, the process proceeds to S708.

In S705, the system control unit 50 acquires setting information of a prediction display mode from the nonvolatile memory 56, and determines whether or not a mode (frame+grid line display mode) for displaying a frame indicating the prediction range and a grid line of the frame is set. If the system control unit 50 determines that the frame+grid line display mode is set, the process proceeds to S706, and otherwise (if a mode for displaying only a frame indicating the prediction range (frame-only display mode) is set), the process proceeds to S707.

Figure 9:
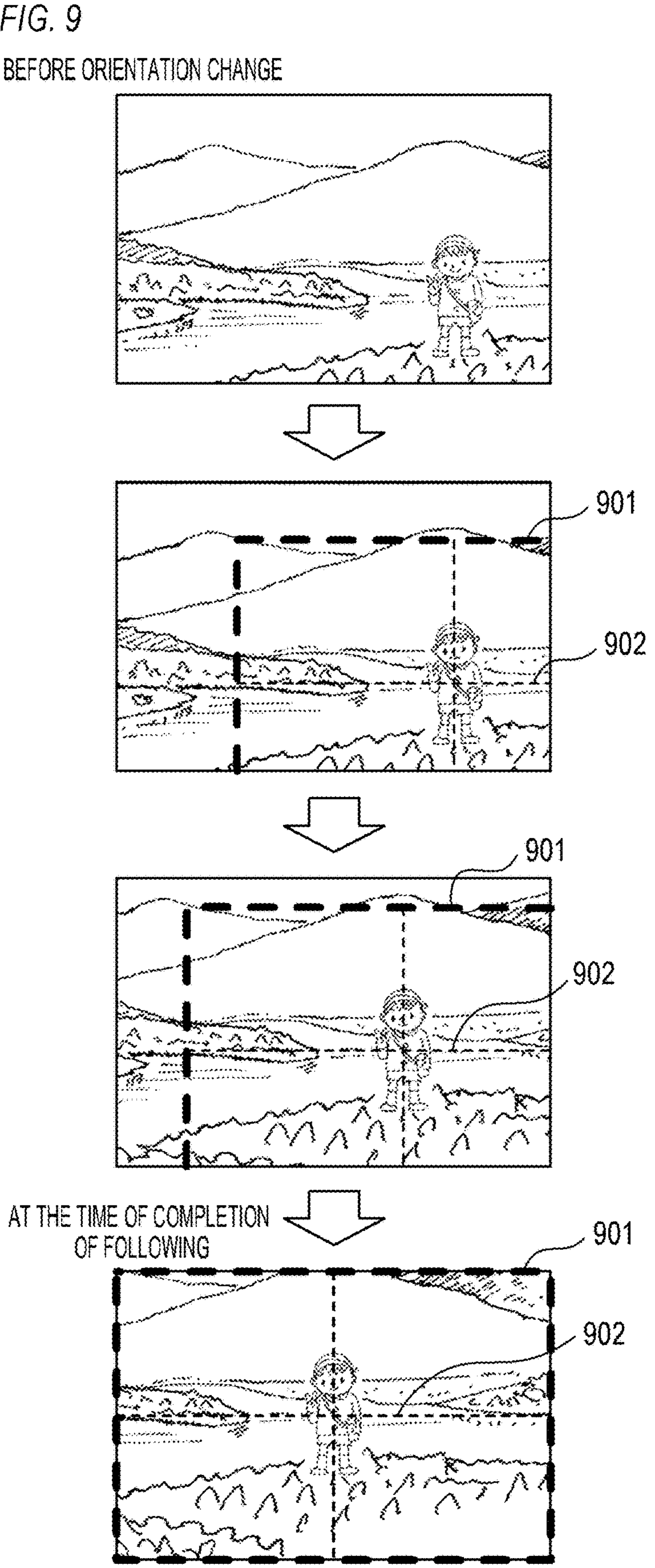
FIG. 9 is a schematic diagram illustrating transition of a display video in a frame+grid line display mode.

In S706, the system control unit 50 acquires the prediction position information and the prediction inclination information from the memory 32 via the memory control unit 15, and determines a prediction range from these pieces of information. Then, the system control unit 50 displays a frame (prediction frame) indicating the prediction range and a grid line of the frame on the display unit 28. FIG. 9 is a schematic diagram illustrating transition of a display video in a frame+grid line display mode. FIG. 9 illustrates transition of a display video when a user turns the grip part 90 to a lower right. Before the user changes the orientation of the grip part 90, neither the prediction frame nor the grid line is displayed, and only the LV image is displayed. When the user changes the orientation of the grip part 90, a prediction frame 901 and a grid line 902 are displayed. The grid line 902 is a line that divides a region (prediction range) surrounded by the prediction frame 901 into four regions of two rows and two columns, and indicates a center position of the region surrounded by the prediction frame 901. Note that the number of divisions by the grid line is not particularly limited, and may be a fixed value or may be arbitrarily set (changed) by the user.

Figure 10:
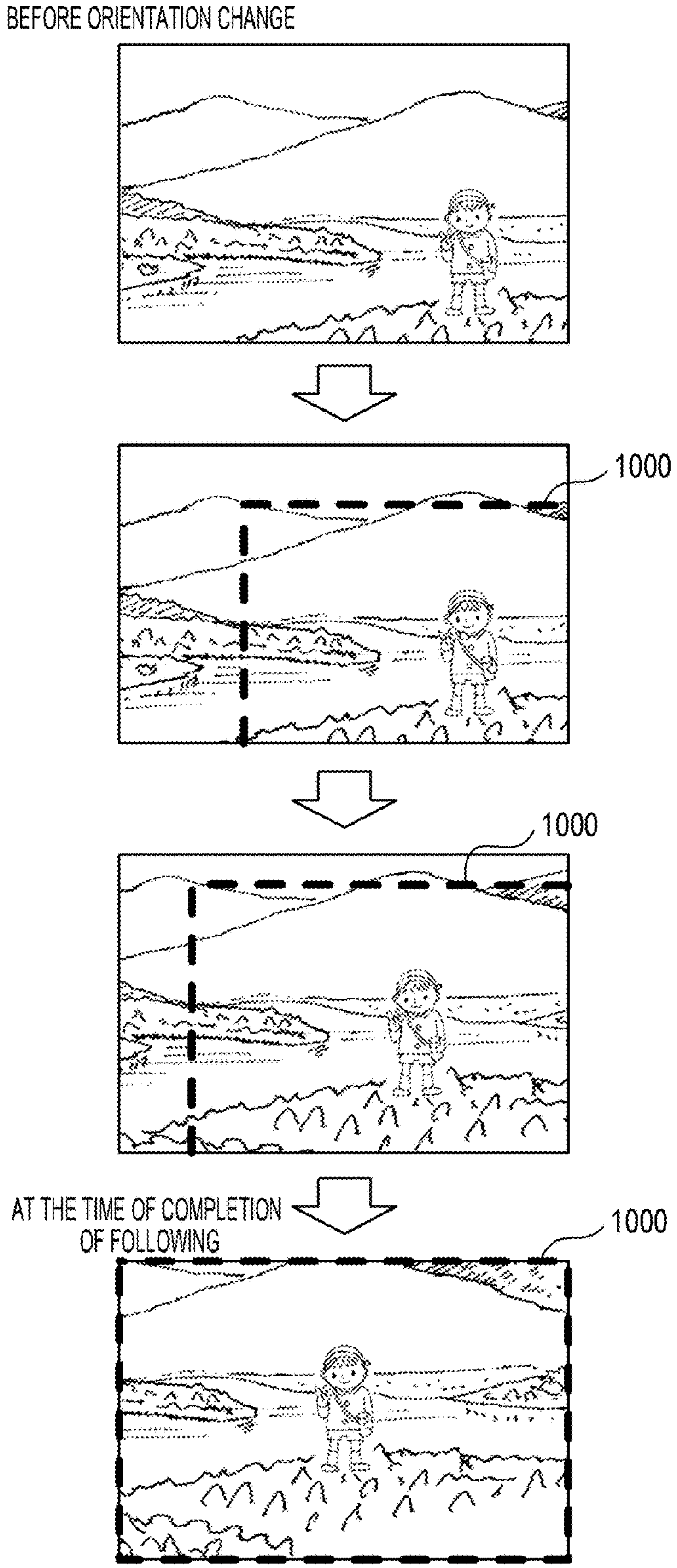
FIG. 10 is a schematic diagram illustrating transition of a display video in a frame-only display mode.

In S707, the system control unit 50 acquires the prediction position information and the prediction inclination information from the memory 32 via the memory control unit 15, and determines a prediction range from these pieces of information. Then, the system control unit 50 displays a frame (prediction frame) indicating the prediction range on the display unit 28. FIG. 10 is a schematic diagram illustrating transition of a display video in a frame-only display mode. FIG. 10 illustrates transition of a display video when a user turns the grip part 90 to a lower right. Before the user changes the orientation of the grip part 90, the prediction frame is not displayed, and only the LV image is displayed. When the user changes the orientation of the grip part 90, a prediction frame 1000 is displayed.

Figure 11A:
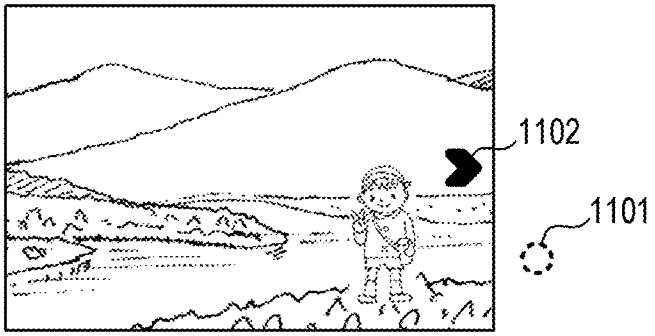
FIGS. 11A to 11C are schematic diagrams illustrating display examples of an out-of-range index.
Figure 11B:
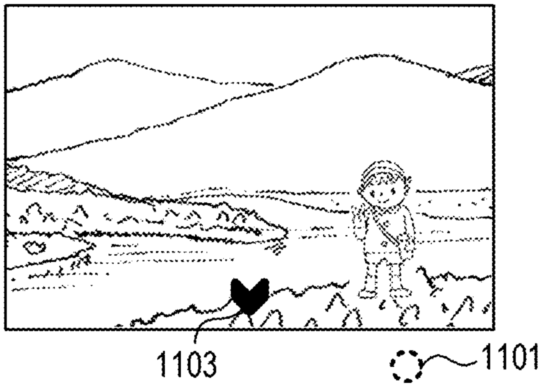
Figure 11C:
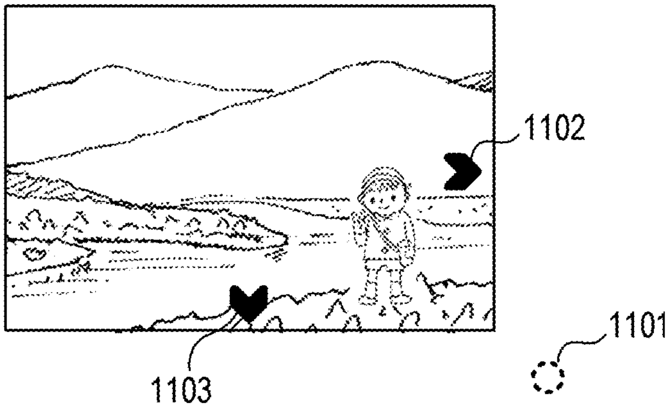

In S708, the system control unit 50 displays, on the display unit 28, an out-of-range index indicating that the prediction range or the prediction position does not overlap the current imaging range. The out-of-range index indicates, for example, a direction of the prediction range or the prediction position with respect to the current imaging range. FIGS. 11A to 11C are schematic diagrams illustrating display examples of the out-of-range index. In FIG. 11A, since a prediction position 1101 appears in a right direction from the current imaging range, an out-of-range index 1102 indicating the right direction is displayed. In FIG. 11B, since the prediction position 1101 appears in a lower direction from the current imaging range, an out-of-range index 1103 indicating the lower direction is displayed. In FIG. 11C, since the prediction position 1101 appears in a lower right direction from the current imaging range, the out-of-range index 1102 indicating the right direction and the out-of-range index 1103 indicating the lower direction are displayed. Another index indicating the lower right direction may be displayed.

Figure 12:
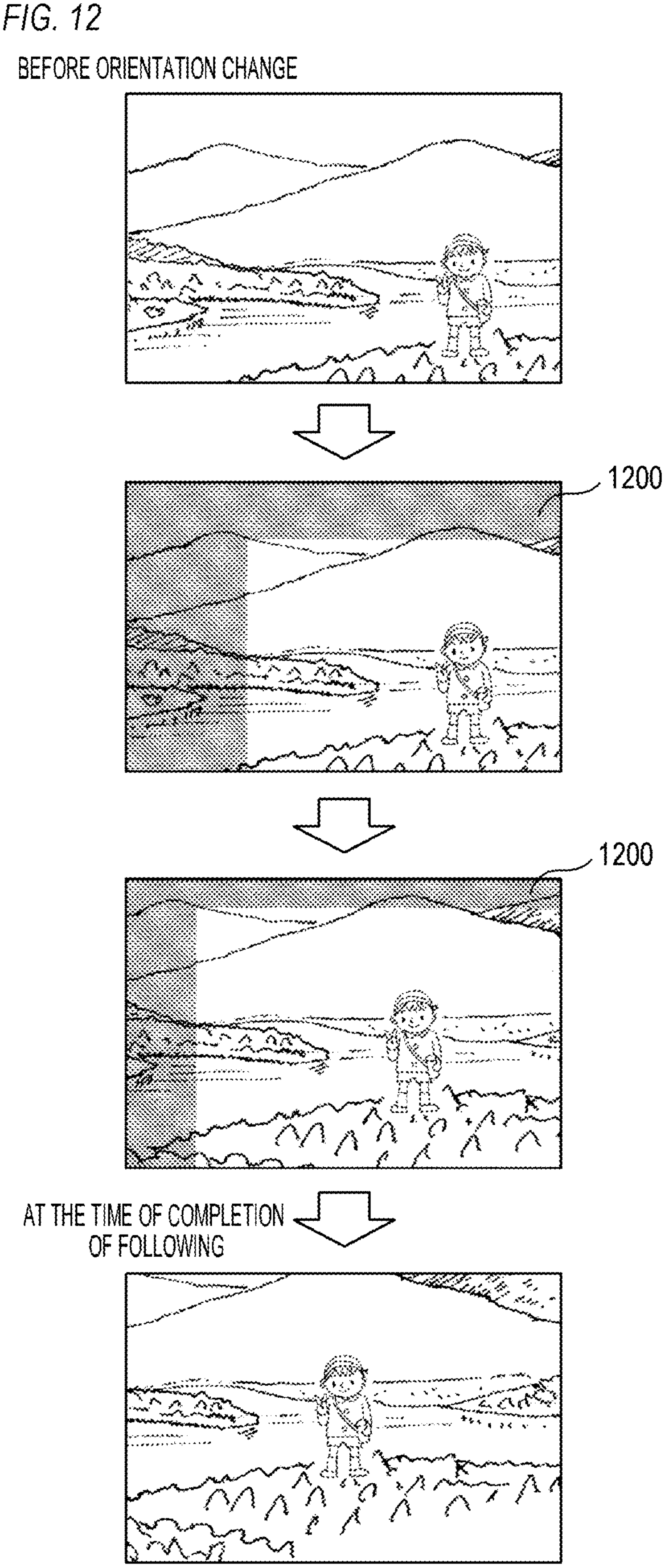
FIG. 12 is a schematic diagram illustrating transition of a display video in a mask mode.

As described above, as the prediction display mode, a mode (mask mode) for masking a region outside the prediction range in the LV image may be settable. FIG. 12 is a schematic diagram illustrating transition of a display video in a mask mode. FIG. 12 illustrates transition of a display video when a user turns the grip part 90 to a lower right. Before the user changes the orientation of the grip part 90, a mask is not displayed, and only an LV image is displayed. When the user changes the orientation of the grip part 90, a mask 1200 covering a region outside the prediction range is displayed. When following by the imaging unit 110 is completed, the mask 1200 is not displayed.

As described above, according to the present embodiment, an imaging range or a position of the imaging range at the time of completion of following by the imaging unit 110 is predicted, and are made identifiable on the LV image. As a result, the user can easily grasp the direction in which the imaging unit 110 finally settles from the prediction range or the prediction position, and can adjust the direction of the grip part 90 before the imaging unit 110 settles. As a result, the user can easily direct the imaging unit 110 to his/her intended direction.

Note that the above-described various types of control may be processing that is carried out by one piece of hardware (e.g., processor or circuit), or otherwise. Processing may be shared among a plurality of pieces of hardware (e.g., a plurality of processors, a plurality of circuits, or a combination of one or more processors and one or more circuits), thereby carrying out the control of the entire device.

Also, the above processor is a processor in the broad sense, and includes general-purpose processors and dedicated processors. Examples of general-purpose processors include a central processing unit (CPU), a micro processing unit (MPU), a digital signal processor (DSP), and so forth. Examples of dedicated processors include a graphics processing unit (GPU), an application-specific integrated circuit (ASIC), a programmable logic device (PLD), and so forth. Examples of PLDs include a field-programmable gate array (FPGA), a complex programmable logic device (CPLD), and so forth.

The embodiment described above (including variation examples) is merely an example. Any configurations obtained by suitably modifying or changing some configurations of the embodiment within the scope of the subject matter of the present invention are also included in the present invention. The present invention also includes other configurations obtained by suitably combining various features of the embodiment.

For example, although the system control unit 50 disposed in the grip part 90 performs various controls, a control unit that performs the various controls described above may be disposed in a portion (device) different from the grip part 90. For example, the control unit may be disposed in the imaging unit 110 or may be disposed in the orientation control unit 300. In addition, although the prediction range or the prediction position is made identifiable by display of an item, a method for making the prediction range or the prediction position identifiable is not particularly limited. For example, the prediction range or the prediction position may be made identifiable by changing a pixel value of the LV image.

After the orientation of the grip part 90 changes, the system control unit 50 may stop the prediction display in response to a lapse of a predetermined time (for example, one second, three seconds, or five seconds) in a state where the grip part 90 is stopped. This improves visibility of the LV display. As a result, for example, the user can easily change the orientation of the grip part 90 again at a suitable timing. The stop of the prediction display may be interpreted as cancellation of the state where the prediction range or the prediction position is made identifiable. Even when a predetermined time has elapsed in the state where the grip part 90 is stopped, the prediction display may be continued in a case where the difference between the orientation of the imaging unit 110 and the orientation of the grip part 90 is equal to or more than the threshold.

The system control unit 50 may control the image processing unit 24 to detect a specific object region (for example, a person region larger than a predetermined size) from the LV image. Then, the system control unit 50 may perform control such that the prediction range or the prediction position is not made identifiable on a specific object region in the LV image. This can improve visibility of the specific object region.

The system control unit 50 may make a display form of the prediction display different between a case where the prediction range or the prediction position is close to a center of the LV image and a case where the prediction range or the prediction position is far from the center. For example, a prediction frame may be displayed in a case where the prediction range or the prediction position is close to the center of the LV image, and a prediction point indicating a center position of the prediction range may be displayed in a case where the prediction range or the prediction position is far from the center of the LV image. This makes it possible to suppress a decrease in visibility of the central portion of the LV image due to the prediction display. The change in the display form of the prediction display may be a change in the type of the prediction display, or does not have to a change in the type of the prediction display. The change in the display form of the prediction display may include a change in color, a change in luminance, or a change in the type of frame (line) or point. In order to suppress a decrease in visibility of the LV image, a prediction frame may be displayed with high saliency in a case where the prediction range or the prediction position is close to the center of the LV image, and the prediction frame may be displayed with low saliency in a case where the prediction range or the prediction position is far from the center of the LV image. A prediction point may be displayed with low saliency in a case where the prediction range or the prediction position is close to the center of the LV image, and the prediction point may be displayed with high saliency in a case where the prediction range or the prediction position is far from the center of the LV image. Saliency may be regarded as a degree of prominence or visibility. Display with high saliency is, for example, display with a dark color or display with low transparency, and display with low saliency is, for example, display with a light color or display with high transparency.

According to the present invention, in a case where an orientation change of the imaging unit is made gentle, a person who performs shooting can easily direct the imaging unit in a direction intended by the person who performs shooting.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-218081, filed on Dec. 25, 2023, which is hereby incorporated by reference herein in its entirety.

What is claimed is:

1. An electronic device comprising:
a processor; and
a memory storing a program which, when executed by the processor, causes the electronic device to
execute acquisition processing to acquire information regarding a difference between an orientation of a grip part gripped by a user and an orientation of imaging part disposed so as to be able to change the orientation with respect to the grip part, and
execute display control processing to perform control so as to display an image captured by the imaging part, wherein
in a case where the orientation of the grip part changes, the orientation of the imaging part follows the orientation of the grip part more gently than the change in the orientation of the grip part, and
in the display control processing, control is performed on a basis of the information such that a range or a position predicted as an imaging range or a position of the imaging range at a time of completion of following by the imaging part is identifiable on the image, and
in the display control processing, whether or not the predicted range or position is identifiable is switched according to an instruction from the user.

2. The electronic device according to claim 1, wherein
the electronic device is an imaging apparatus further comprising:
the grip part; and
the imaging part, and
the program, when executed by the processor, further causes the electronic device to execute control processing to control the orientation of the imaging part such that the orientation of the imaging part follows the orientation of the grip part more gently than a change in the orientation of the grip part in a case where the orientation of the grip part changes.

3. The electronic device according to claim 1, wherein
the program, when executed by the processor, further causes the electronic device to execute detection processing to detect the orientation of the grip part, and
in the acquisition processing, the information is acquired on a basis of the orientation of the grip part.

4. The electronic device according to claim 1, wherein
in the display control processing, control is performed so as to display a frame indicating the predicted range.

5. The electronic device according to claim 1, wherein
in the display control processing, control is performed so as to display a frame indicating the predicted range and a grid line of the frame.

6. The electronic device according to claim 1, wherein
in the display control processing, control is performed so as to display a point indicating the predicted position.

7. The electronic device according to claim 1, wherein
in the display control processing, control is performed so as to mask a region outside the predicted range in the image.

8. The electronic device according to claim 1, wherein
in the display control processing, a display form in which the predicted range or position is identifiable is changed according to an instruction from the user.

9. The electronic device according to claim 1, wherein
in a case where the difference between the orientation of the imaging part and the orientation of the grip part is smaller than a threshold, in the display control processing, control is performed such that the predicted range or position is not identifiable.

10. The electronic device according to claim 9, wherein in the display control processing, the threshold is changed according to an instruction from the user.

11. The electronic device according to claim 1, wherein in a case where the predicted range or position does not overlap a current imaging range, in the display control processing, control is performed so as to display an index indicating that the predicted range or position does not overlap the current imaging range.

12. The electronic device according to claim 11, wherein the index indicates a direction of the predicted range or position with respect to the current imaging range.

13. The electronic device according to claim 1, wherein in the display control processing, control is performed so as to cancel a state where the predicted range or position is identifiable in response to a lapse of a predetermined time in a state where the grip part is stopped.

14. The electronic device according to claim 1, wherein in the display control processing, control is performed such that the predicted range or position is not identifiable on a specific object region in the image.

15. The electronic device according to claim 1, wherein in the display control processing, a display form in which the predicted range or position is identifiable is differed between a case where the predicted range or position is close to a center of the image and a case where the predicted range or position is far from the center.

16. A control method of an electronic device, comprising:

acquiring information regarding a difference between an orientation of a grip part gripped by a user and an orientation of imaging part disposed so as to be able to change the orientation with respect to the grip part; and performing control so as to display an image captured by the imaging part, wherein in a case where the orientation of the grip part changes, the orientation of the imaging part follows the orientation of the grip part more gently than the change in the orientation of the grip part, and control is performed on a basis of the information such that a range or a position predicted as an imaging range or a position of the imaging range at a time of completion of following by the imaging part is identifiable on the image, and whether or not the predicted range or position is identifiable is switched according to an instruction from the user.

17. A non-transitory computer readable medium that stores a program, wherein the program causes a computer to execute a control method of an electronic device, the control method comprising:

acquiring information regarding a difference between an orientation of a grip part gripped by a user and an orientation of imaging part disposed so as to be able to change the orientation with respect to the grip part; and performing control so as to display an image captured by the imaging part, wherein in a case where the orientation of the grip part changes, the orientation of the imaging part follows the orientation of the grip part more gently than the change in the orientation of the grip part, and control is performed on a basis of the information such that a range or a position predicted as an imaging range or a position of the imaging range at a time of completion of following by the imaging part is identifiable on the image, and whether or not the predicted range or position is identifiable is switched according to an instruction from the user.

* * * * *